June 12, 1934.   J. F. KOVALSKY   1,962,353
PHOTOSENSITIVE CONTROL APPARATUS
Filed March 27, 1931
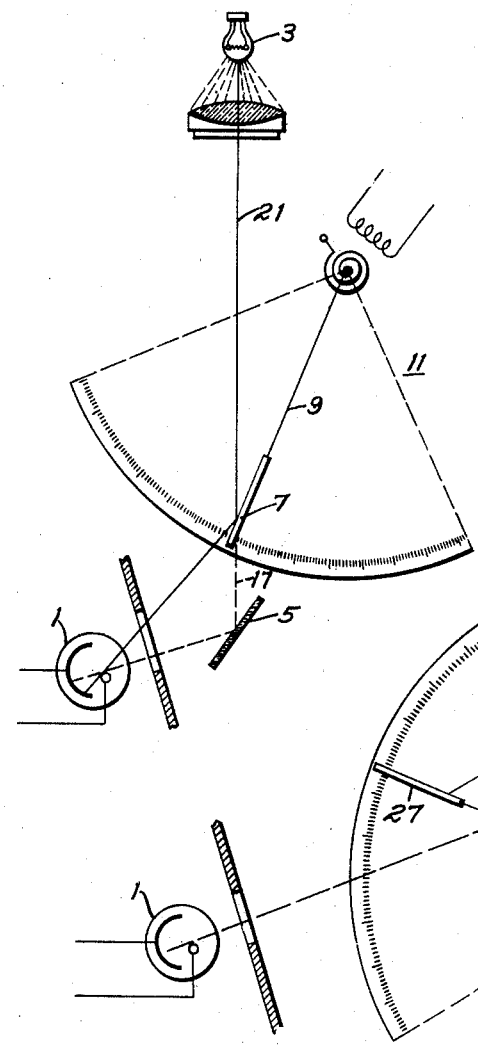
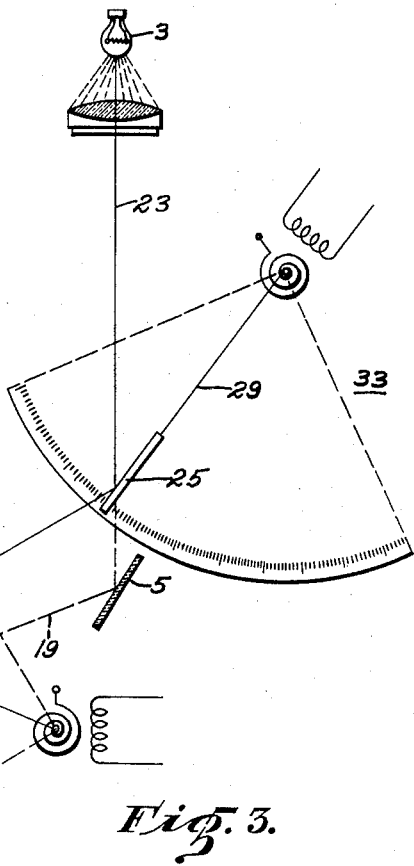
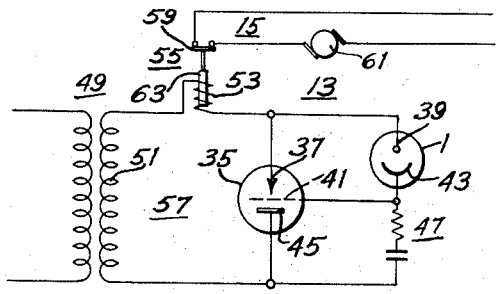
WITNESSES
R. S. Williams
Hymen Diamond
INVENTOR
Joseph F. Kovalsky
BY
Chesley G. Carr
ATTORNEY Patented June 12, 1934

1,962,353

UNITED STATES PATENT OFFICE 1,962,353

PHOTOSENSITIVE CONTROL APPARATUS

Joseph F. Kovalsky, Turtle Creek, Pa., assignor to Westinghouse Electric & Manufacturing Company, a corporation of Pennsylvania Application March 27, 1931, Serial No. 525,803

3 Claims. (Cl. 250—41.5)

My invention relates to control apparatus and has particular relation to trigger elements adapted to actuate systems whereby the operation of control apparatus is initiated.

It is an object of my invention to provide a highly sensitive trigger for actuating control apparatus.

Another object of my invention is to provide a trigger for actuating control apparatus, the sensitivity of which shall be capable of any desired variation.

A more specific object of my invention is to provide a trigger element for control apparatus of a type adapted to regulate the condition of a predetermined property of an operating system.

Another specific object of my invention is to provide a trigger element for control apparatus of a type adapted to regulate the condition of a system relative to a plurality of predetermined properties thereof.

More concisely stated, it is an object of my invention to provide a sensitive trigger element that shall be responsive to a plurality of predetermined conditions of a system, relative to predetermined properties thereof, and that shall be capable of actuating control apparatus for regulating the predetermined properties of the system.

According to my invention, I provide a trigger comprising a photo-sensitive device and a source of radiant energy for energizing the sensitive element of the device. Under ordinary circumstances, the rays from a light source either impinge directly on the sensitive surface of the photo-sensitive device or are reflected thereto from a stationary mirror and the device is in an energized state.

However, when the property of the system under observation attains a condition in the vicinity of the point where regulation begins, the beam of light comes under the influence of a reflector mounted on the movable element of an indicating instrument, responsive to the property of the system that is under regulation. The beam is now reflected into the photo-sensitive device by the moving element and its angle of deflection is equal to twice the angle through which the element is moved under the action of the particular property of the system that is under regulation. When the condition of the system attains the predetermined critical point, the beam is deflected away from the photo-sensitive device, and the operation of the control system is initiated.

It will be noted that, in the above-described arrangement, the geometric-reflection property of a light beam is utilized only on the vicinity of the critical point of the system and, consequently, both the movable mirror and the photosensitive device may be comparatively small.

The geometric dimensions of the reflector are of no small moment in this connection in view of the fact that the response of a movable element of the instrument would be seriously impaired by a heavy mirror attached thereto.

In accordance with the teachings of the prior art the practice has been, in a system of the type described herein, to so project a beam of light to a photo-cell that it is obstructed by the movable element of the instrument when the critical point is attained. This practice has the disadvantage that the sensitivity is impaired by the region of uncertainty which arises from the unavoidable finite width of the light beam to be obstructed. In obstructing the beam of light the movable element must necessarily move through an angle corresponding to the width of the beam from the position at which the outer edge of the beam is intersected to the position at which the whole beam is intersected. The sensitivity of the systems constructed in accordance with the teachings of the prior art is, therefore, limited by the width of the light beam.

It is a feature of my invention that the sensitivity of the apparatus may be increased to any reasonable magnitude in the region of the critical point. In accordance with my invention the light beam is completely intercepted by the reflector mounted on the movable element and deflected by the reflector to the photo-cell, just before the critical condition is attained. As the movable element is now pivoted in the region of the critical point the beam reflected from the mirror mounted on the movable element is deflected over the surface of the photo-cell. However, near the photo-cell, the reflected beam traces out a path which corresponds to the path traced out by the movable element in its movement but which is considerably longer for a given movement of the movable element than is the path traced out by the movable element. This condition arises by reason of the fact that for every angular movement of the movable element the reflected beam is deflected through an angle which is equal to twice the angle of movement of the element and for the additional reason that the path traversed by the reflected beam in the region of the photo-cell is substantially directly proportional to the length of the reflected beam.

The result which follows from the above consideration may be best seen by regarding the markings of the scale of the instrument as they are crossed by the movable element as plotted at the corresponding points covered by the reflected beam in the region of the photo-cell. The resultant plot will be a scale similar to the instrument scale but with the markings spaced by a distance equal substantially to the product of twice the length of the reflected beam and the spacing of the markings on the instrument scale. It is seen that if the reflected beam is made long enough the ratio between the width of the light beam and the spacing of the smallest markings of the plotted scale, can be made small and the sensitivity of the apparatus can thus be correspondingly increased. The sensitivity may thus be raised to any desired magnitude and is limited only by the length which it is possible to give to the reflected beam.

On the other hand, the sensitivity of the system may be regulated by the distance between the moving reflecting surface and the photo-sensitive device. If high sensitivity is desired, the throw of the beam of light may be increased until the particular sensitivity is attained. Hence, if the photo-sensitive surface must be large enough to receive the beam of light over a comparatively large angle of its deflection, the possible sensitivity of the trigger is considerably decreased.

My invention may be also applied to the regulation of a system relative to a plurality of properties thereof. In such apparatus, a plurality of reflectors are supported on elements responsive to the particular properties of the system which are regulated. As the system attains a critical condition relative to the one or the other of the properties, the beam of light exciting the photo-sensitive device is transferred from a stationary reflector to the movable reflector that is associated with the particular property.

In particular, my system has been applied to the regulation of the current applied for energizing electric heaters. A system of this character ordinarily comprises a container enveloped by a coil and having disposed therein a charge that is to be heated or melted. The charge may be heated by the magnetic induction effect of a current flowing in the coil or it may be heated by the heat conducted from the coil which is, in turn, heated by the electrical current dissipated therein. In such systems, it is highly desirable that the charge shall not attain a temperature beyond a predetermined value. It is furthermore, highly desirable that the heating element itself, that is, the coil, shall not attain such temperature that its insulation is destroyed or becomes oxidized or melted.

In systems of this type, the one movable reflector is mounted on an element responsive to the temperature of the charge, while another reflector is mounted on an element responsive to the temperature of the heating coil. The responsive elements may be simply the movable components of meters, by means of which the temperatures of the heating element and that of the charge are measured. The meters are connected to the terminals of thermocouples or other heat-responsive devices in a manner well known in the art.

The novel features that I consider characteristic of my invention are set forth with particularity in the appended claims. The invention itself, however, both as to its organization and its method of operation, together with additional objects and advantages thereof, will best be understood from the following description of specific embodiments, when read in connection with the accompanying drawing, in which:

Figure 1 is a schematic view showing the essential elements of a control system constructed according to my invention, Fig. 2 is a schematic view showing the essential elements of apparatus applied to the control of more than one property of a system, and Fig. 3 is a diagrammatic view, showing the relay system associated with the photo-sensitive device utilized in actuating the control system.

The apparatus shown in Fig. 1 comprises a photo-sensitive device 1, that is adapted to be energized from a source of light 3, the rays from which are reflected, under normal conditions, by a stationary mirror 5. However, when the property of the system attains a condition in the vicinity of its critical point, the beam of light is no longer reflected into the photo-tube 1 by the stationary mirror 5, but is transferred to a mirror 7 mounted on the movable element 9 of an indicating instrument 11 that is, in turn, responsive to the property of the system in question.

As the state of excitation of the movable component 9 of the instrument 11 is increased, the angular position of the reflector is changed, and the beam of light is deflected by an angle that is equivalent to twice the angle of rotation of the reflector 7. When the property of the system attains the critical condition, the beam is deflected to such extent that the photo-sensitive device 1 becomes deenergized, and a relay system 13 is energized. The relay system is associated with the circuit 15 whereby the properties of the system are regulated in accordance with the requirements.

In the drawing, the broken lines 17 and 19 show the normal path of the beam of light, and the full lines 21 and 23 show its path when it is influenced by a movable reflector.

In Fig. 2, my invention is shown as applied to the operation of a multiple control system. The photo-sensitive device 1 is excited by a beam of light reflected from the stationary mirror 5, under normal conditions. The reflectors 25 and 27, supported on the movable elements 29 and 31 of the indicating instruments 33 and 35, that are adapted to respond to the particular properties of the system in question, are moved into such position that the beam of light comes under their influence when the properties approach their critical condition. When the condition of the system passes beyond the predetermined limit, the beam of light is deflected away from the photo-sensitive device 1, and the relay system 13 is energized to produce the desired results.

In Fig. 3, the relay system 13, associated with the photo-sensitive device 1, is shown. The system includes an electric-discharge tube 35 of the grid-controlled type. The anode 37 of the tube 35 is connected to the anode 39 of the photo-sensitive device 1, and the control electrode 41 of the tube 35 is connected to the cathode 43 of the photo-sensitive device. The cathode 45 of the tube 35 is connected to the junction point of the control electrode 41 and the cathode 43 of the photo-sensitive device 1, through an impedance 47 of the requisite type.

Power is supplied to the tube 35 through a transformer 49, the secondary 51 of which is connected across the principal electrodes 37 and 45 thereof. The exciting coil 53 of a relay 55, that is adapted to produce the necessary control, is also connected in the principal circuit 57 of the tube 35.

As shown in Fig. 3, the movable contactor 59 of the relay 55 closes the circuit 15 through a generator 61. The generator may be of the type adapted to supply the heating current to the heating coil of a furnace, for example. As long as the photo-tube 1 is in energized condition, the electric-discharge device 35 is also in an energized condition, and the exciting coil 53 of the relay 55 is energized. However, when the photo tube 1 becomes deenergized, the electric-discharge tube 35 becomes deenergized, and the exciting coil of the relay is also deenergized. The core 63 of the relay then drops, and the circuit through the generator 61 is broken.

If the example just mentioned is utilized, the current through the heating coils of the furnace is interrupted, and the furnace begins to cool down.

A multiplicity of structures involving the essential elements of my invention but varying from the specific embodiment shown herein, are possible. Of these modifications, the most apparent system is one wherein the control system is of a type that is inactive when the photo-sensitive device is unexcited but becomes active when the photo-sensitive device is excited. In such case, the beam of light is reflected to the photo tube rather than away from it when the property of the system attains the critical condition. The electrical circuit involving the photo tube and grid-controlled electric-discharge device is also modified in a requisite manner to conform to the change in the trigger element.

Essentially, my invention comprises a trigger for a control system, wherein a controlling beam of light is operated by a reflector rotating in accordance with the condition of the property of the system which it is desirable to control. The reflector is comparatively small in order to be motivated by the movable element in an indicating instrument which is responsive to the property of the system, and, consequently, it only assumes its condition of affecting the beam of light when the property of the system is in the vicinity of its critical condition.

Although I have shown and described certain specific embodiments of my invention, I am fully aware that many modifications thereof are possible. My invention, therefore, is not to be restricted, except in so far as is necessitated by the prior art and by the spirit of the appended claims.

I claim as my invention:

1. Apparatus for regulating the condition of a system with respect to a predetermined property comprising means for varying the condition of said system with respect to said property, means, including a photo-sensitive device, for energizing said varying means, said varying means being energized when said photo-sensitive device is energized and being deenergized when said photo-sensitive device is deenergized, means to respond to the condition of said system with respect to said predetermined property, means, including means to project a beam of radiant energy, to maintain said photo-sensitive device energized while the condition of said system is being varied and lies on one side of a predetermined well-defined range of values and means to cooperate with said responsive means when said condition approaches the region of said predetermined range of values to deflect said beam of radiant energy thereby to maintain said varying means energized over said range of values and to deenergize said varying means when the condition of said system attains a value on the other side of said range of values.

2. Apparatus for regulating the condition of a system with respect to a predetermined property comprising, means, including a photo-sensitive device, for varying the condition of said system with respect to said property, said varying means having an energized and a deenergized condition and said photo-sensitive device being energized to maintain said varying means in one of said conditions and being deenergized to maintain said varying means in the other of said conditions, means for producing a beam of radiant energy, a fixed reflector for projecting said beam on said photo-sensitive device to actuate said varying means to vary the condition of said system in a predetermined sense, and means including a reflector to be moved in response to the variations of the condition of said system and when in the path of said beam to deflect said beam over a limited angle, for deflecting said beam away from said fixed reflector to energize said photo-sensitive device when the condition attains a predetermined value and to deenergize said photo-sensitive device when the condition passes beyond a second predetermined value.

3. Apparatus for regulating the condition of a system with respect to a predetermined property comprising means for varying the condition of said system with respect to said property, means, including a photo-sensitive device, for energizing said varying means, said varying means being energized when said photo-sensitive device is energized and being deenergized when said photo-sensitive device is deenergized, means to respond to the condition of said system with respect to said predetermined property, means, including means to project a beam of radiant energy, to maintain said photo-sensitive device energized while the condition of said system is being varied and lies on one side of a predetermined well-defined range of values and means, including a reflector and means to be actuated by said responsive means to motivate said reflector, for deflecting said beam of radiant energy away from said photo-sensitive device when said condition lies within said well defined range of values thereby to deenergize said varying means when the condition attains a value on the other side of said range of values.

JOSEPH F. KOVALSKY.